(12) United States Patent
Iden

(10) Patent No.: US 8,695,225 B2
(45) Date of Patent: Apr. 15, 2014

(54) MIRRORED COMPASS FOR IMPROVED DIRECTIONAL READING

(75) Inventor: Marlin Iden, Riverton, WY (US)

(73) Assignee: Fenix Outdoor AB, Ornskoldsvik (SE)

(*) Notice: Subject to any disclaimer, the term of this patent is extended or adjusted under 35 U.S.C. 154(b) by 157 days.

(21) Appl. No.: 13/181,934

(22) Filed: Jul. 13, 2011

(65) Prior Publication Data

US 2013/0014398 A1  Jan. 17, 2013

(51) Int. Cl.
*G01C 17/04* (2006.01)

(52) U.S. Cl.
USPC ........................................ 33/355 R

(58) Field of Classification Search
USPC ............................... 33/348, 355 R
See application file for complete search history.

(56) References Cited

U.S. PATENT DOCUMENTS

| | | | | |
|---|---|---|---|---|
| 1,571,697 | A * | 2/1926 | Bernegau | 33/352 |
| 4,395,828 | A * | 8/1983 | Juhas | 33/348 |
| 6,516,526 | B1 * | 2/2003 | Iden | 33/355 R |
| 2002/0104224 | A1 * | 8/2002 | Barker | 33/355 R |
| 2010/0126030 | A1 * | 5/2010 | Weller et al. | 33/355 R |
| 2010/0139106 | A1 * | 6/2010 | Atwood | 33/418 |

* cited by examiner

*Primary Examiner* — G. Bradley Bennett
(74) *Attorney, Agent, or Firm* — Nixon & Vanderhye PC

(57) ABSTRACT

A recreational or outdoor mirrored compass is comprised of a base member, a hinged cover with a mirror and a sighting window for sighting a land mark, and a vial assembly pivotally coupled to said base member. The vial assembly comprises of a vial, a magnetized indicator member pivotally journaled in the vial and an azimuth ring. The compass further comprises of a hinge member for coupling the cover hingewise to the base member and a locking arrangement to lock the cover relative to the hinge member.

15 Claims, 8 Drawing Sheets

MIRRORED COMPASS FOR IMPROVED DIRECTIONAL READING

FIELD OF THE INVENTION

The present invention relates to an outdoor or recreational compass, more particularly to a hand-held mirrored compass for orienteering.

BACKGROUND OF THE INVENTION

Compasses of various kinds are known in the state of the art and are used for orienteering, i.e. the practice of using a compass, generally in combination with a topographic map, to determine a bearing or the route of travel. Commonly, classical or conventional compasses comprise a base member and a vial assembly pivotally coupled to the base member. The vial assembly comprises a vial and an azimuth ring as well as a magnetized indicator member pivotally journaled in the vial. Generally, the magnetized indicator member is a kind of a needle pointing to magnetic north. Moreover, an orienting marker is located in the vial, which is commonly in form of an orienting arrow.

For taking a bearing for a destination visually, the compass is held level with a direction-to-travel arrow pointing towards the desired destination. For instance, the latter one can be a land mark like a mountain, a hill or a building. As a next step, the azimuth ring is rotated until the orienting arrow lines up with the needle, thus, both pointing to magnetic north. However, accurate sighting of a land mark and simultaneously taking a bearing is demanding and can lead to errors. To overcome such problems, the compass can be equipped with a hinged cover comprising a mirror and a sighting window or a similar device for sighting a land mark. Such compasses are commonly called mirrored compasses. This allows sighting the land mark through the sighting window and simultaneously allows reading the needle alignment and azimuth ring in the reflection of the mirror.

Although usage of mirrored compasses greatly facilitates the directional reading, it is still prone to inaccuracies caused by parallax, i.e. an apparent displacement of an object when viewed from different sights. In particular, the mirrored image has to embrace the whole vial assembly as the sighted land mark may be e.g. in the north or in the south of the user. Thus, this may cause the bearing to be inaccurately taken resulting in unintended detours or even leading to dangerous situations when one gets lost in the wilderness.

Thus, the objective of the present invention is to provide a mirrored compass which facilitates the sighting of a land mark and simultaneously allows for a non-parallaxed directional reading.

SUMMARY OF THE INVENTION

The present invention is directed to overcoming the problems set forth above by providing a mirrored compass with a sighting window allowing for an a non-parallaxed directional reading with the features of claim 1. Preferred embodiments of the invention are disclosed in the dependent claims 2 to 12.

The inventive mirrored compass comprises a base member, a hinged cover comprising a mirror and a sighting window for sighting a land mark or the like, and a vial assembly pivotally coupled to said base member. The vial assembly comprises a vial, a magnetized indicator member pivotally journaled in the vial and pointing to magnetic north, and an azimuth ring. Furthermore, the compass comprises a hinge member for coupling the cover hingewise to the base member and a locking arrangement to lock the cover relative to the hinge member.

Hence, when a bearing is taken, the cover can be locked relative to the hinge member such that the desired part of the vial assembly is reflected in the mirror. This allows to provide a smaller mirror, which is solely configured to reflect parts of the vial assembly and, thus, not the vial assembly in its entirety. Accordingly, as not the whole vial assembly needs to be mirrored, the axis of reflection can be adjusted which greatly reduced or even completely avoids parallax.

Accordingly, the above stated features enable the user to take a more precise and non-parallaxed bearing. The destination reading is thus ameliorated.

According to another aspect of the invention, the locking arrangement is configured to lock the cover in at least one position relative to the hinge member. Hence, the cover can be locked in a predefined position such that the desired part of the vial assembly is reflected in the mirror. Moreover, the cover can be locked in two or more different but predefined positions. These positions can be optimized such that it is ensured to have a non-parallaxed destination reading.

According to another aspect of the invention, the cover can be locked in an angle between 10° and 30°, preferably at 23° relative to the hinge member. In this position, that part of the vial assembly being farthest to the hinge member is reflected in the mirror.

According to another aspect of the invention, the cover can be locked in an angle between 80° and 100°, preferably at 90° relative to the hinge member. In this position, that part of the vial assembly being nearest to the hinge member is reflected in the mirror.

According to another aspect of the invention, the locking arrangement comprises at least one detention means which can releasable lock the cover relative to the hinge member. For instance, the detention means can be provided as notches that catch with a respective projection. The notches can either be provided at the cover or at the hinge member. With a small amount of force, the cover can be unlocked and moved from one locking position to another locking position.

According to another aspect of the invention, the hinge member is configured to lock the cover in the closed position. Thus, unintended opening of the compass is avoided. By way of example, damaging of the mirror or scratching the vial when the compass is carried in a backpack is virtually impossible.

According to another aspect of the invention, the hinge member comprises of at least one latching means that can releasable engage with an opening of the base member. Thus, the cover can be securely locked in its closed position. Alternatively, the latching means may also be configured to lock the cover in one or more open positions. Preferably, the latching means and the opening are embodied as a snap-in connection.

According to another aspect of the invention, the hinge member comprises a first hinge and a second hinge, the first hinge and the second hinge being parallel and spaced by a link. This ensures the largest possible flexibility for positioning the cover relative to the vial assembly. Hence, the reflection in the mirror is not subject to parallax.

According to another aspect of the invention, the first hinge is coupled to the cover and the second hinge is coupled to the base member. Hence, the cover is indirectly coupled to the base member via two hinge axles.

According to another aspect of the invention, the base member comprises at least one lug to couple the second hinge to the base member. Thus, the second hinge can easily be coupled to the base member.

According to another aspect of the invention, the vial is transparent. This ensures that the compass can be used together with a map by placing the compass onto the map, still being able to identify the map's content, e.g. longitudinal lines.

According to another aspect of the invention, the vial is filled with a fluid, preferably with a damping fluid. The fluid dampens the spinning action of the needle. Hence, shivering of the needle is avoided resulting in a quicker and more accurate readability of the bearing.

The foregoing is given more for the purpose of illustration and not limitation with respect to different features of the compass.

The above and other objects, advantages and features of the present invention will become more readily appreciated and understood from consideration of the following detailed description of a preferred embodiment of the present invention when taken together with the accompanying drawings.

DETAILED DESCRIPTION OF THE DRAWINGS

Figure 1:
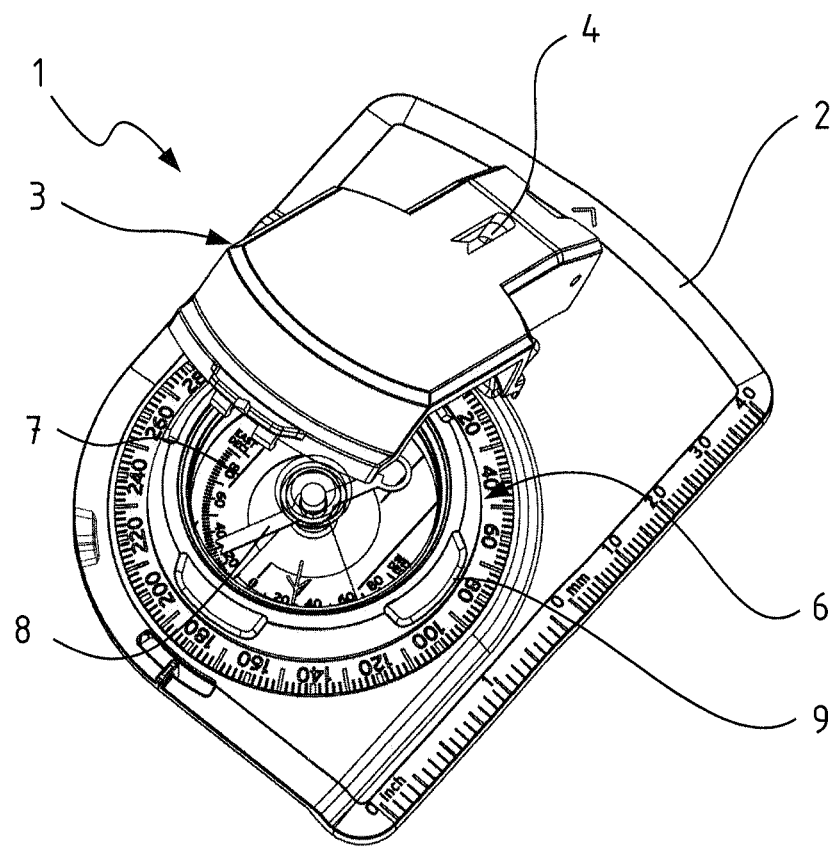
FIG. 1 is a perspective top view of the preferred embodiment of the invention.

A compass 1 is illustrated in FIGS. 1 to 5 broadly comprise of a transparent base member 2 being made of a transparent plastic material, a cover 3 hingewise coupled to the base member 2 and a vial assembly 6 pivotally mounted to the base member 2. The vial assembly 6 comprise of transparent vial 7 filled with a dampening fluid, a magnetized indicator member 8 pivotally journaled in the vial 7 and an azimuth ring 9. The magnetized indicator member 8 is a needle having a north end and a south end. The azimuth ring 9 has a degree scale covering 0° to 360° in 2°-steps. Furthermore, the base member 2 has a ruler on one side.

Figure 2:
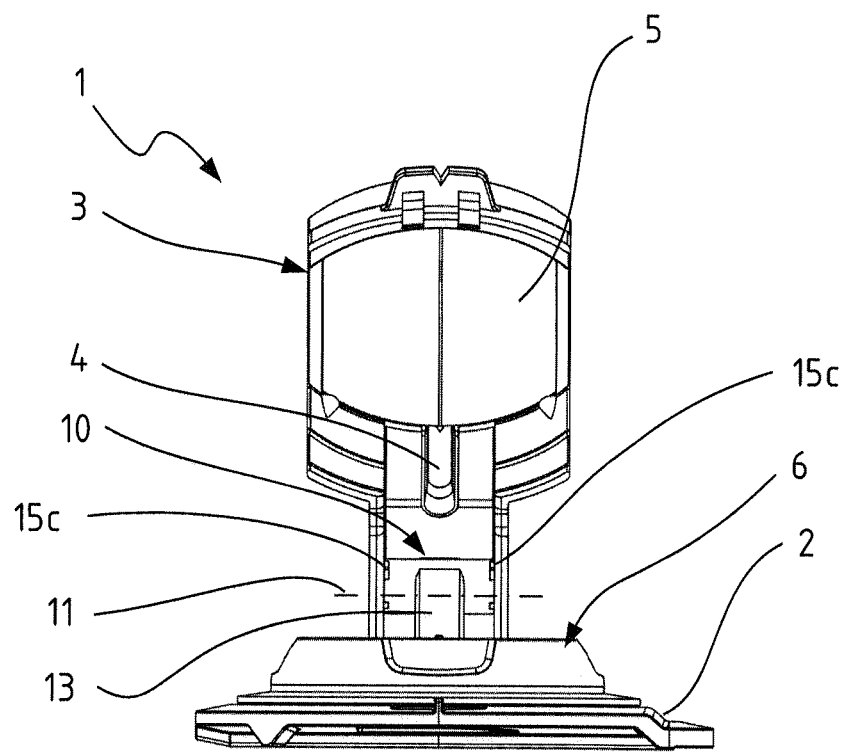
FIG. 2 is a front view of the compass of FIG. 1.
Figure 3:
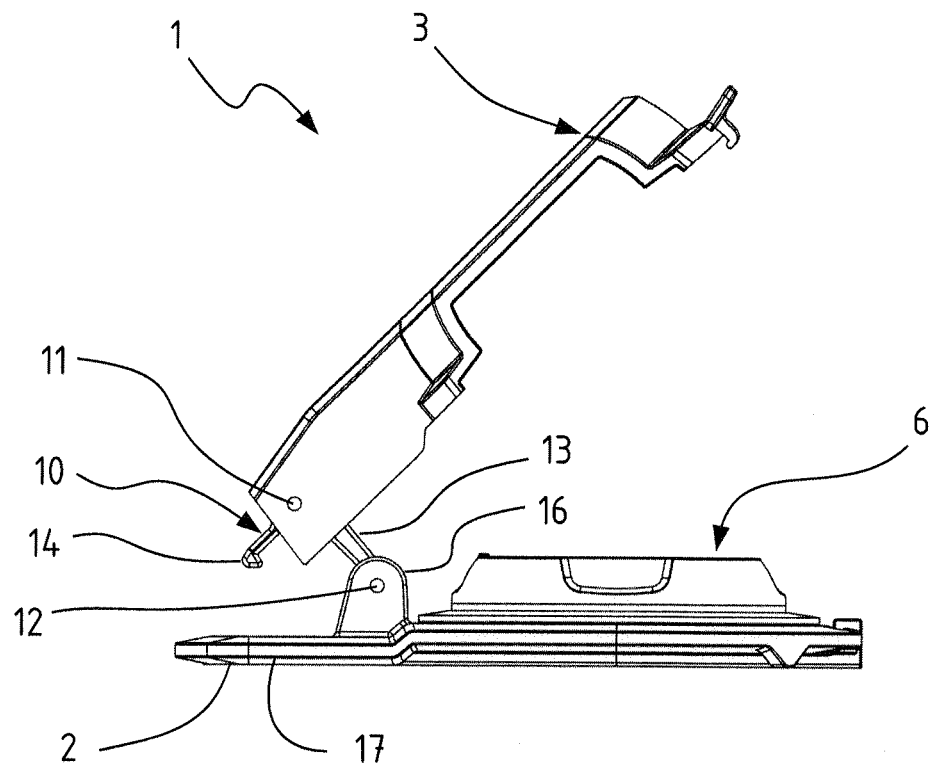
FIG. 3 is lateral view of the compass of FIG. 1.
Figure 4:
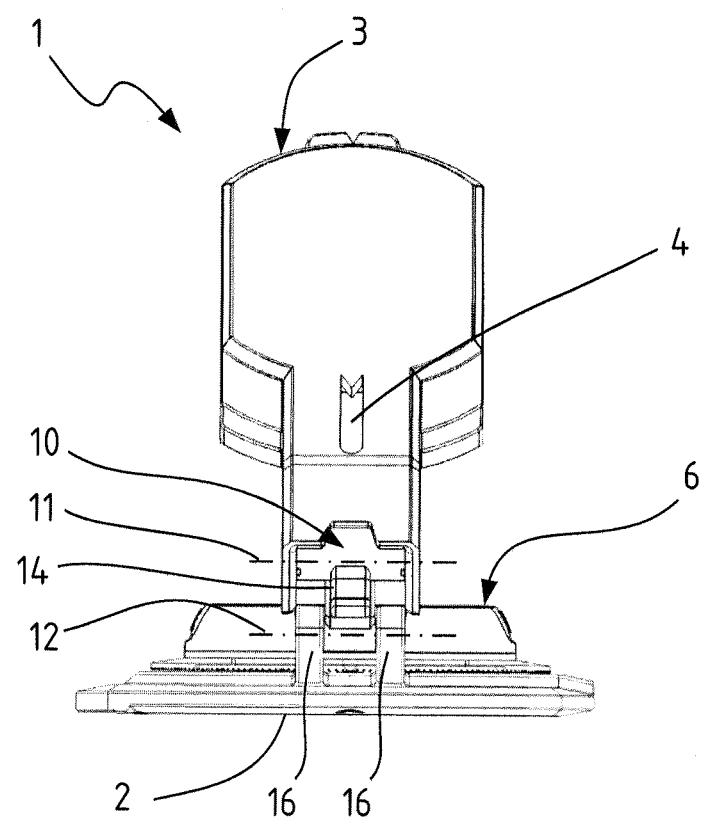
FIG. 4 is back view of the compass of FIG. 1.
Figure 5:
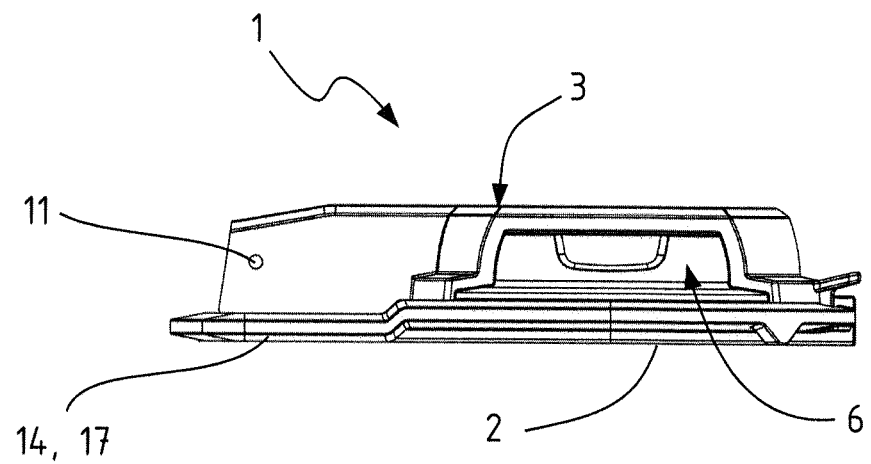
FIG. 5 is lateral view of the compass of FIG. 1 with closed cover.

As best seen in FIG. 2, the cover 3 further comprises a sighting window 4 for sighting land marks and a mirror 5 positioned on that part of the cover 3 facing the vial assembly 6. The mirror 4 reflects parts of the vial assembly 6 when taking a bearing. The cover 3 is indirectly coupled to the base member 2 via a hinge member 10.

Figure 6:
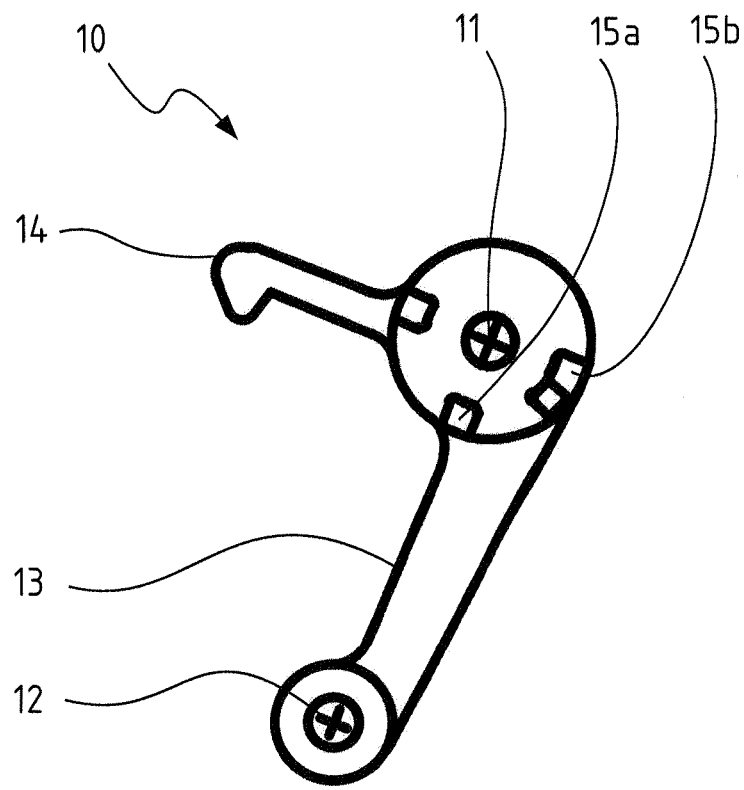
FIG. 6 is detailed view of the hinge member of the compass of FIG. 1.

A detailed view of the hinge member 10 is illustrated in FIG. 6. The hinge member 10 comprises a first hinge 11 coupled to the cover 3 and a second hinge 12 coupled to the lugs 16 of the base member 2. The first hinge 11 and the second hinge 12 are parallel and spaced by a link 13. Preferably, the first hinge 11 and the second hinge 12 are spaced by 10 mm to 20 mm, preferably by 15 mm. The hinge member 10 has a latching means 14 essentially extending vertically to the first hinge 11. The latching means 14 is configured to releasable engage with an opening 17 of the base member 2 to lock the cover 3 in its closed position, see FIGS. 3 and 5. Preferably, the latching means 14 and the opening 17 are a snap-in connection.

Moreover, the cover 3 can be locked in two positions (see FIG. 7) via the locking arrangement 15. The locking arrangement 15 comprises of two notches 15a, 15b positioned radially outwardly from the first hinge 11. The notches 15a, 15b catch with a respective projection 15c provided at the cover 3 such that the first hinge 11 is blocked. To unlock the cover 3 and to move it into another predefined position, the user applies some force to the cover 3 such that projection 15c and either notch 15a, 15b release. As a matter of course, more than two notches 15a, 15b may by provided to the hinge member 10 such that more than two predefined positions of the cover 3 are possible.

Figure 7A:
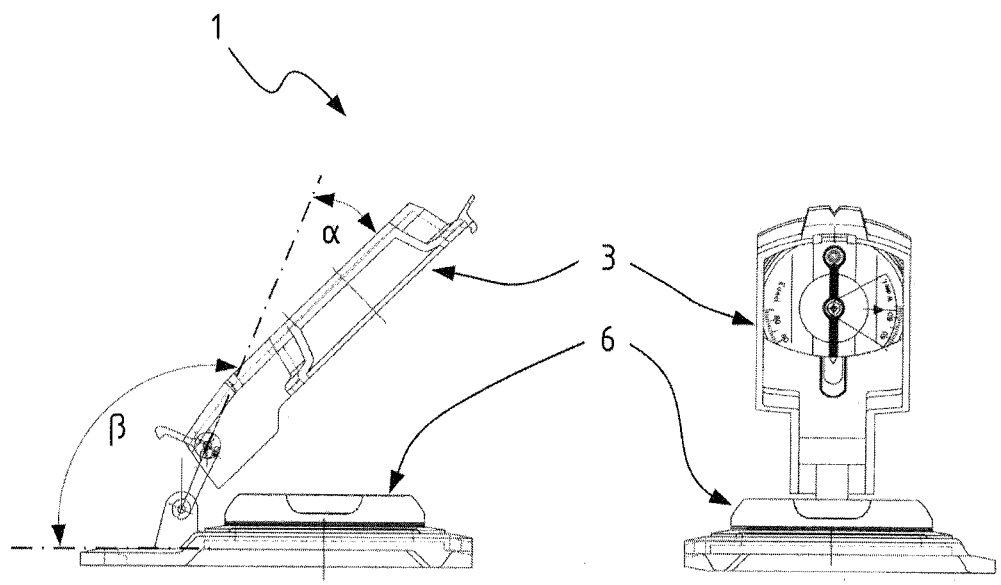
FIG. 7 are a front and lateral views of the compass of FIG. 1 with the cover locked in two different positions.

Preferably, the cover 3 can be locked in a first predefined position with an angle α of 23° relative to the link 13 of the hinge member 10. As best seen in FIG. 7a, the second hinge 12 is not blocked and the cover 3 can still be pivoted relative to the base member 2. Preferably, when the cover 3 is brought into an angle β between 100° and 120°, preferably of 112° relative to the base member 2, the part of the vial assembly 6 being farthest from the second hinge 12 is reflected in the mirror 5, as can be seen from the right representation in FIG. 7a.

Figure 7B:
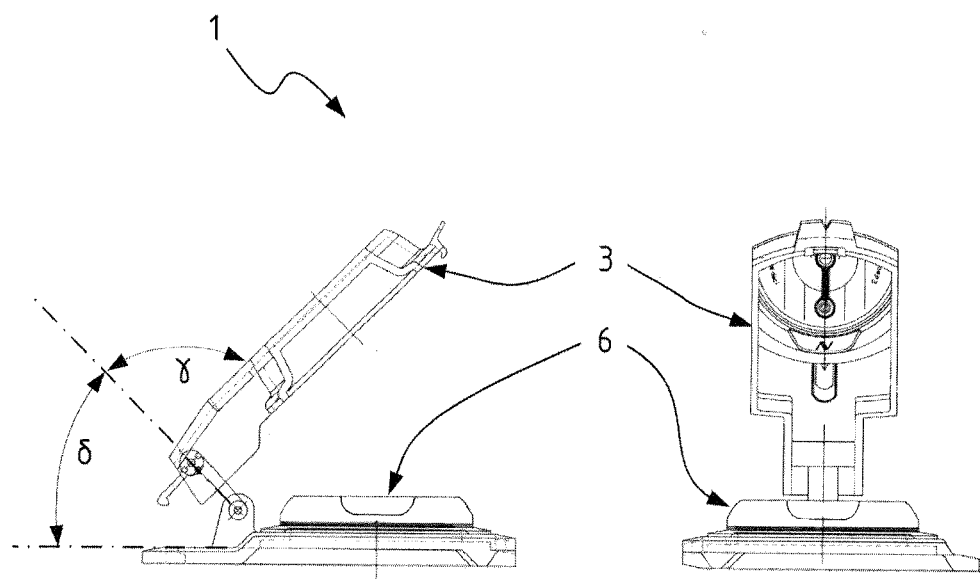

Similarly, the cover 3 can be locked in a second predefined position with an angle γ of 90° relative to the link 13 of the hinge member 10. As best seen in FIG. 7b, the freely movable second hinge 12 is not blocked. Preferably, the cover is brought into an angle δ between 40° and 60°, preferably of 45° relative to the base member 2. In that position, the part of the vial assembly 6 being nearest to the second hinge 12 is reflected in the mirror 5, as can be seen from the right representation in FIG. 7b.

Accordingly, as not the whole vial assembly 6 needs to be reflected in the mirror 5, the mirror 5 can be made smaller allowing for a more manageable compass 1. Furthermore, this greatly reduces parallax of viewing the vial assembly 6 in the mirror 5, as the line of sight can be optimized depending on what part of the vial assembly 6 is to be mirrored.

It is also within the scope of the invention that the second hinge 12 can be locked relative to link 13 of the hinge member 10 at least in two predefined positions according to those described above. Accordingly, this will allow for a total of four predefined positions.

While a preferred embodiment of the invention is herein set forth and described, it is to be understood that various modifications and changes may be made therein including but not limited to construction and arrangement of elements as well as their composition without departing from the spirit and scope of this invention as defined by the appended claims and reasonable equivalents thereof.

Reference Signs 1 compass
2 base member
3 cover
4 sighting window
5 mirror
6 vial assembly
7 vial
8 magnetized indicator member/needle
9 azimuth ring
10 hinge member
11 first hinge
12 second hinge 13 link
14 latching means
15 locking arrangement
15a detent/notch
15b detent/notch
15c detent/projection
16 lug
17 opening
α first locking angle
β cover angle
γ second locking angle
δ cover angle

The invention claimed is:

1. A mirrored compass comprising
a base member;
a hinged cover comprising a mirror and a sighting window for sighting a land mark or the like; and
a vial assembly pivotally mounted to said base member, the vial assembly comprising:
a vial;
a magnetized indicator member journaled in the vial; and
an azimuth ring;
a hinge member for coupling the cover hingwise to the base member; and
a locking arrangement to lock the cover at one or more predefined angles relative to the hinge member.

2. The compass of claim 1, wherein the locking arrangement is configured to lock the cover at two or more different, but predefined angles relative to the hinge member.

3. The compass of claim 2, wherein the cover can be locked in an angle (α) between 10° and 30°, preferably at 23° relative to the hinge member.

4. The compass of claim 2, wherein the cover can be locked in an angle (γ) between 80° and 100°, preferably at 90° relative to the hinge member.

5. The compass of claim 1, wherein the locking arrangement comprises at least one detention means which can releasable lock the cover relative to the hinge member.

6. The compass of claim 1, wherein the hinge member is configured to lock the cover in the closed position.

7. The compass of claim 6, wherein the hinge member comprises at least one latching means that can releasable engage with an opening of the base member.

8. The compass of claim 1, wherein the hinge member comprises a first hinge and a second hinge, the first hinge and the second hinge being parallel and spaced by a link.

9. The compass of claim 8, wherein the first hinge is coupled to the cover and the second hinge is coupled to the base member.

10. The compass of claim 9, wherein the base member comprises at least one lug to couple the second hinge to the base member.

11. The compass of claim 1, wherein the vial is transparent.

12. The compass of claim 1, wherein the vial is filled with a fluid.

13. The compass of claim 8, wherein the locking arrangement is comprised of one notch positioned radially outwardly from the first hinge and a projection provided at the cover, the notch catching with the projection provided at the cover, so that the first hinge is blocked, whereby the cover is locked at one predefined angle relative to the hinge member.

14. The compass of claim 8, wherein the locking arrangement is comprised of first and second notches positioned radially outwardly from the first hinge and a projection provided at the cover, the first and second notches catching with the projection provided at the cover, so that the first hinge is blocked, whereby the cover is locked at first and second different, but predefined angles relative to the hinge member.

15. The compass of claim 8, wherein the locking arrangement is comprised of a plurality of notches positioned radially outwardly from the first hinge and a projection provided at the cover, the plurality of notches catching with the projection provided at the cover, so that the first hinge is blocked, whereby the cover is locked at a plurality of different, but predefined angles relative to the hinge member.

* * * * *